(12) United States Patent
Close et al.

(10) Patent No.: US 11,214,102 B2
(45) Date of Patent: Jan. 4, 2022

(54) PROTECTIVE ASSEMBLY FOR TYRE PRESSURE SENSOR

(71) Applicant: Caterpillar SARL, Geneva (CH)

(72) Inventors: Gordon Close, Peterlee (GB); Kevin Maughan, Houghton (GB); Hayley Clarke, Wingate (GB); Matthew Hess, Aurora, IL (US)

(73) Assignee: Caterpillar SARL, Geneva (CH)

( * ) Notice: Subject to any disclaimer, the term of this patent is extended or adjusted under 35 U.S.C. 154(b) by 320 days.

(21) Appl. No.: 16/548,435

(22) Filed: Aug. 22, 2019

(65) Prior Publication Data

US 2020/0079161 A1 Mar. 12, 2020

(30) Foreign Application Priority Data

Sep. 12, 2018 (GB) ...................................... 1814815

(51) Int. Cl.
*B60C 23/04* (2006.01)
*B60C 29/06* (2006.01)

(52) U.S. Cl.
CPC ...... *B60C 23/0494* (2013.01); *B60C 23/0422* (2013.01); *B60C 29/06* (2013.01)

(58) Field of Classification Search
CPC . B60C 23/0494; B60C 23/0422; B60C 29/06; B60C 2200/06; B60C 9/005; B60C 9/02; B60C 23/0496; B60C 23/0498
USPC ........................................................ 73/146.8
See application file for complete search history.

(56) References Cited

U.S. PATENT DOCUMENTS

| | | | |
|---|---|---|---|
| 4,016,918 A | 4/1977 | Thacker | |
| 8,327,700 B2 | 12/2012 | Nagora | |
| 2004/0046649 A1 | 3/2004 | Sanchez et al. | |
| 2008/0284576 A1* | 11/2008 | Zhou | B60C 23/0496 340/442 |
| 2008/0314135 A1* | 12/2008 | Liao | B60C 23/0496 73/146.5 |
| 2011/0315235 A1* | 12/2011 | Colefax | B60C 23/0408 137/224 |
| 2012/0235809 A1* | 9/2012 | Cantarelli | B60C 23/0452 340/445 |
| 2013/0092306 A1 | 4/2013 | White et al. | |
| 2013/0213126 A1* | 8/2013 | Li | B60C 23/0408 73/146.5 |
| 2016/0023523 A1* | 1/2016 | Palacios | B60C 23/0496 73/146.8 |

FOREIGN PATENT DOCUMENTS

| | | | |
|---|---|---|---|
| CN | 201989574 U | 9/2011 | |
| CN | 104527341 A | 4/2015 | |
| CN | 105539030 A | 5/2016 | |
| WO | WO-2020135571 A * | 7/2020 | ........... B60C 29/005 |

OTHER PUBLICATIONS

Search Report for related United Kingdom Application No. 1814815.5; report dated Dec. 10, 2018.

* cited by examiner

*Primary Examiner* — Eric Blount
(74) *Attorney, Agent, or Firm* — von Briesen & Roper, s.c.

(57) ABSTRACT

A tyre pressure sensor is mounted at the distal end of a valve stem mounted on a wheel. A protective assembly comprises a body which is releasably attached to the wheel, and a cap which is releasably attached to the body. The valve stem and pressure sensor are enclosed within the body and the cap.

10 Claims, 8 Drawing Sheets

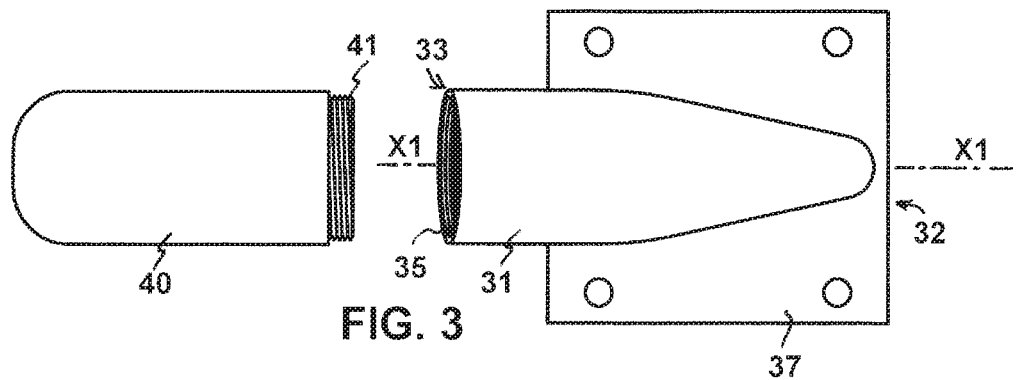
FIG. 3
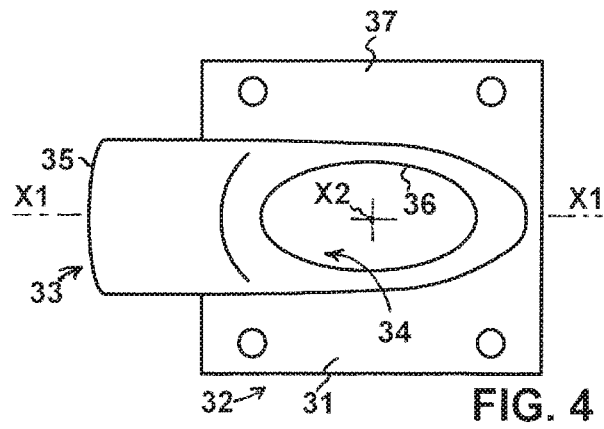
FIG. 4
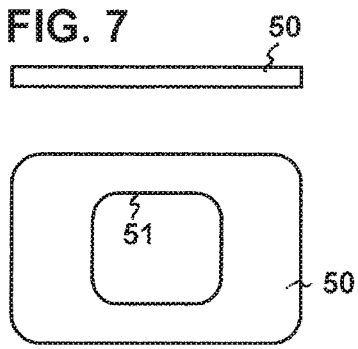
FIG. 7
FIG. 6
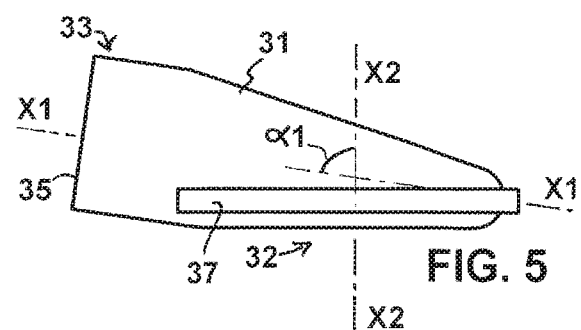
FIG. 5
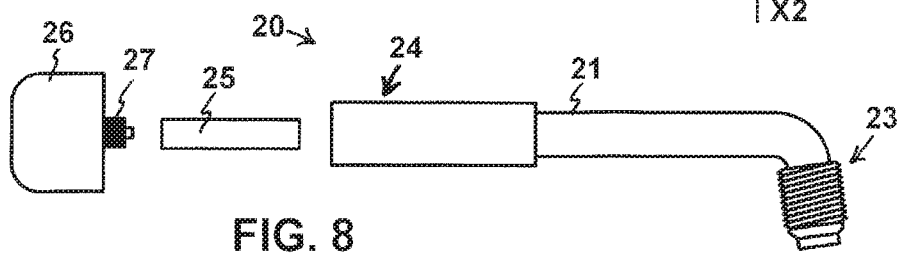
FIG. 8

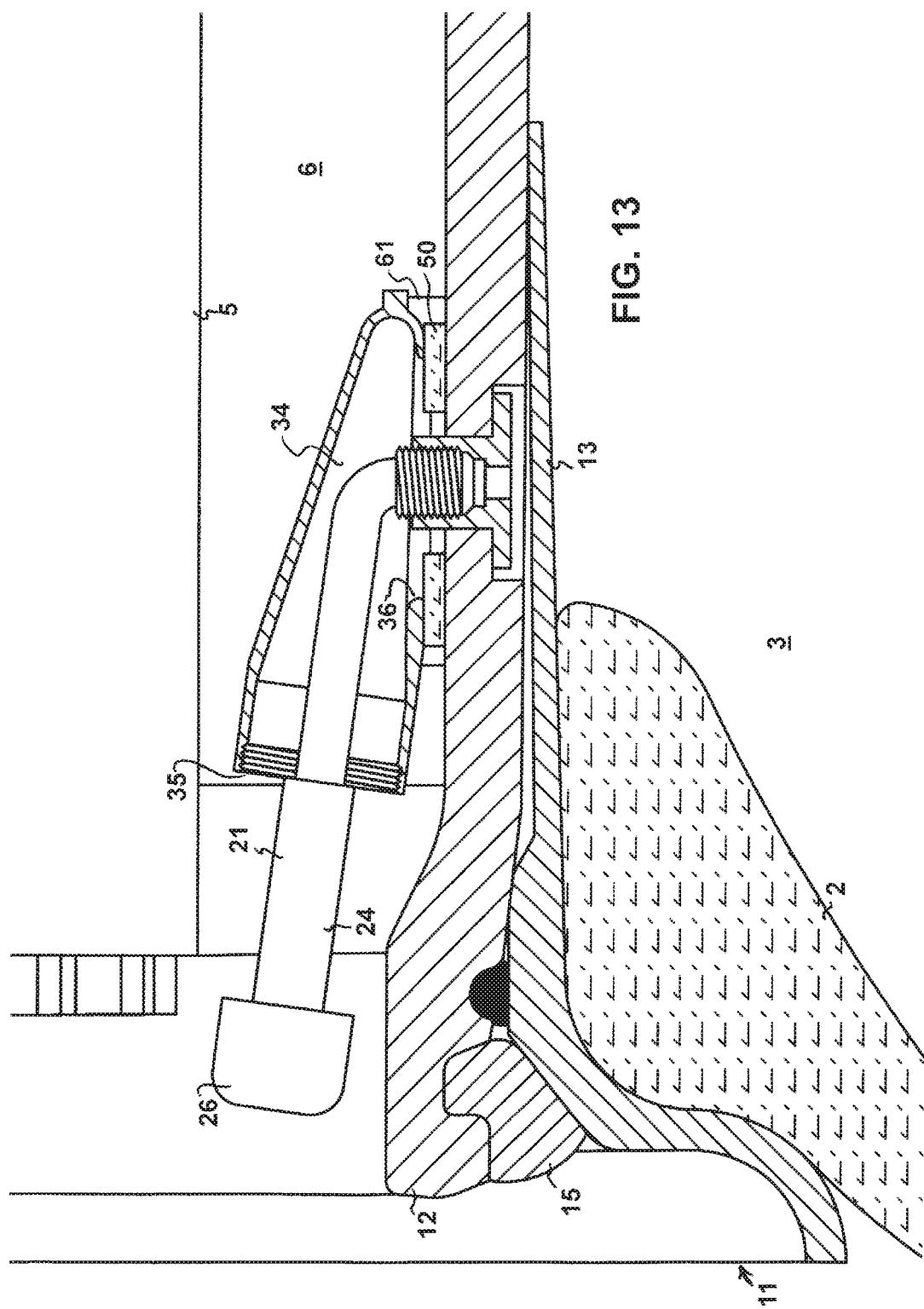

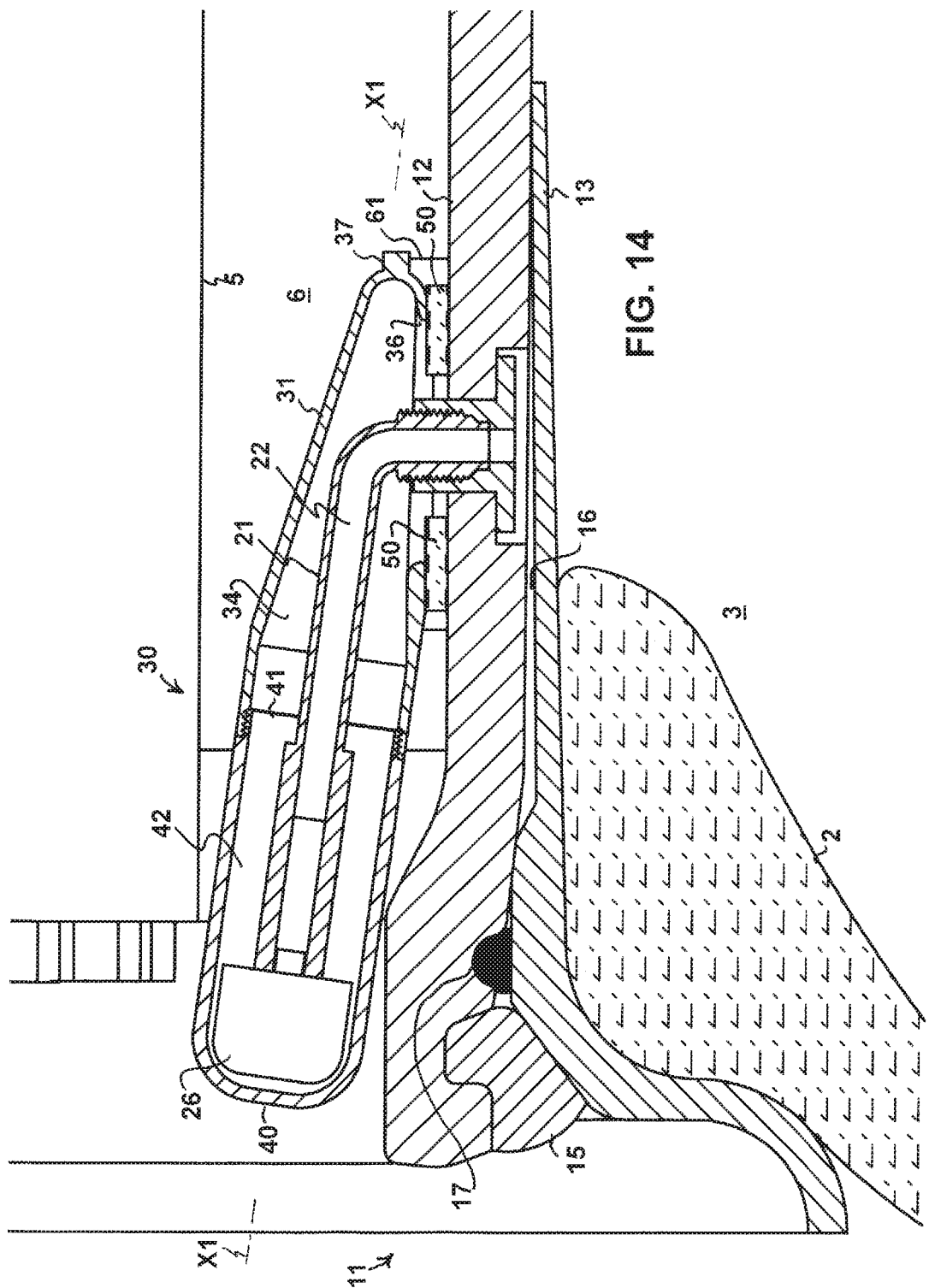

PROTECTIVE ASSEMBLY FOR TYRE PRESSURE SENSOR

CROSS-REFERENCE TO RELATED APPLICATION

This application claims priority under 35 USC § 119 and the Paris Convention to United Kingdom Patent Application No. 1814815.5 filed on Sep. 12, 2018.

TECHNICAL FIELD

This disclosure relates to protective arrangements for pressure sensors fitted to wheels with pneumatic tyres to sense the inflation pressure of the tyre.

BACKGROUND

It is known to configure a pressure sensor to be connected to the distal (outer) end of the valve stem, exterior to the wheel rim. Locating the pressure sensor at the exterior of the wheel means that it is easier to fit and maintain and, since signals transmitted from the body of pressure sensor are not screened by the wheel rim, the pressure sensor can be of a simple, one-piece design.

However, the external location at the distal end of the valve stem exposes the pressure sensor to potential impact damage, particularly in off-road use when debris is thrown up from the ground surface.

In larger off-road vehicles it is known to weld a protective barrier to extend radially inwardly from the wheel rim to partially enclose the valve stem on one or more sides so as to protect it from impact damage. However, such barriers tend to trap dirt during off-road operations which can make it difficult to access the valve for maintenance.

US 20160023523 A1 discloses a tyre pressure sensor assembly in which the valve core is fixed in an adaptor housing, the adaptor housing being fixed to extend radially inwardly from the wheel rim with respect to the wheel axis, and closed by an RF permeable cap which encloses the sensor.

In heavy vehicles such as articulated dump trucks with a hub reduction axle, the wheel hub and final drive assembly commonly occupies most of the available space inside the wheel rim, with the valve stem being accommodated in the limited annular space between the wheel rim and the hub. Since there is insufficient room to accommodate the valve stem in a conventional, radial orientation, the valve stem is typically bent close to its proximal end which is connected to the wheel, so that its distal end portion extends axially outwardly proximate the wheel rim and substantially in parallel with the wheel axis. The valve core and pressure sensor can be mounted at the distal end of the valve stem for ease of access.

In such vehicles the space between the wheel rim and the hub and final drive assembly is often too small to accommodate either a conventional, welded barrier or an adapted valve housing to protect the pressure sensor. Even if sufficient space is available, the barrier or valve housing may obstruct access for maintenance or safety checks to fixings of the hub or final drive assembly, or to the wheel nuts or clamps by which the disc or rim of the wheel is fixed to the hub.

SUMMARY

In a first aspect the present disclosure provides a protective assembly for use with a pressure sensor mounted on a valve assembly, the valve assembly being mounted on a wheel.

The wheel includes a rim and a pneumatic tyre supported on the rim. The valve assembly includes a valve stem having a proximal end and a distal end. The proximal end of the valve stem is connected to the wheel, with the pressure sensor being mounted at the distal end of the valve stem in fluid communication via the valve stem with a pressurised interior space of the tyre.

The protective assembly includes a body and a cap, the body including a proximal region and a distal region and defining a space, the space opening to an exterior of the body at the proximal region and the distal region of the body. The proximal region of the body is releasably attachable to the wheel in a use position of the body to receive the valve stem within the space. The cap is releasably attachable to the distal region of the body in a closed position of the cap so that the cap and the body together enclose the pressure sensor and the valve stem in the use position of the body and the closed position of the cap.

In a second aspect, the present disclosure provides an assembly including a protective assembly as described above, a wheel, a valve assembly mounted on the wheel, and a pressure sensor mounted on the valve assembly.

The wheel includes a rim and a pneumatic tyre supported on the rim. The valve assembly includes a valve stem having a proximal end and a distal end, the proximal end of the valve stem being connected to the wheel, the pressure sensor being mounted at the distal end of the valve stem in fluid communication via the valve stem with a pressurised interior space of the tyre.

The proximal region of the body is releasably attached to the wheel in the use position of the body, the valve stem being received within the space. The cap is releasably attached to the distal region of the body in the closed position of the cap so that the cap and the body together enclose the pressure sensor and the valve stem.

BRIEF DESCRIPTION OF THE DRAWINGS

Further features and advantages will be apparent from the illustrative embodiment which will now be described, purely by way of example and without limitation to the scope of the claims, and with reference to the accompanying drawings, in which:

FIG. 3 is a top view of the body and cap of the protective assembly;

FIG. 4 is a bottom view of the body;

FIG. 5 is a side view of the body;

FIGS. 6 and 7 are respectively a top view and a side view of a seal of the protective assembly;

FIG. 8 is an exploded view of the valve assembly and pressure sensor;

FIGS. 11-14 show the region of the protective assembly in the section of FIG. 2, wherein:

FIG. 11 shows the valve assembly and one of the mounting blocks installed on the wheel rim before fixing the body;

FIG. 12 shows the assembly of FIG. 11 after fixing the body to the mounting blocks in the use position;

FIG. 13 shows the assembly of FIG. 12 with the body sectioned at II-II and the pressure sensor mounted at the distal end of the valve stem; and FIG. 14 shows the assembly of FIG. 13 with the cap in the closed position.

Reference numerals and characters appearing in more than one of the figures indicate the same or corresponding parts in each of them.

DETAILED DESCRIPTION

Figure 1:
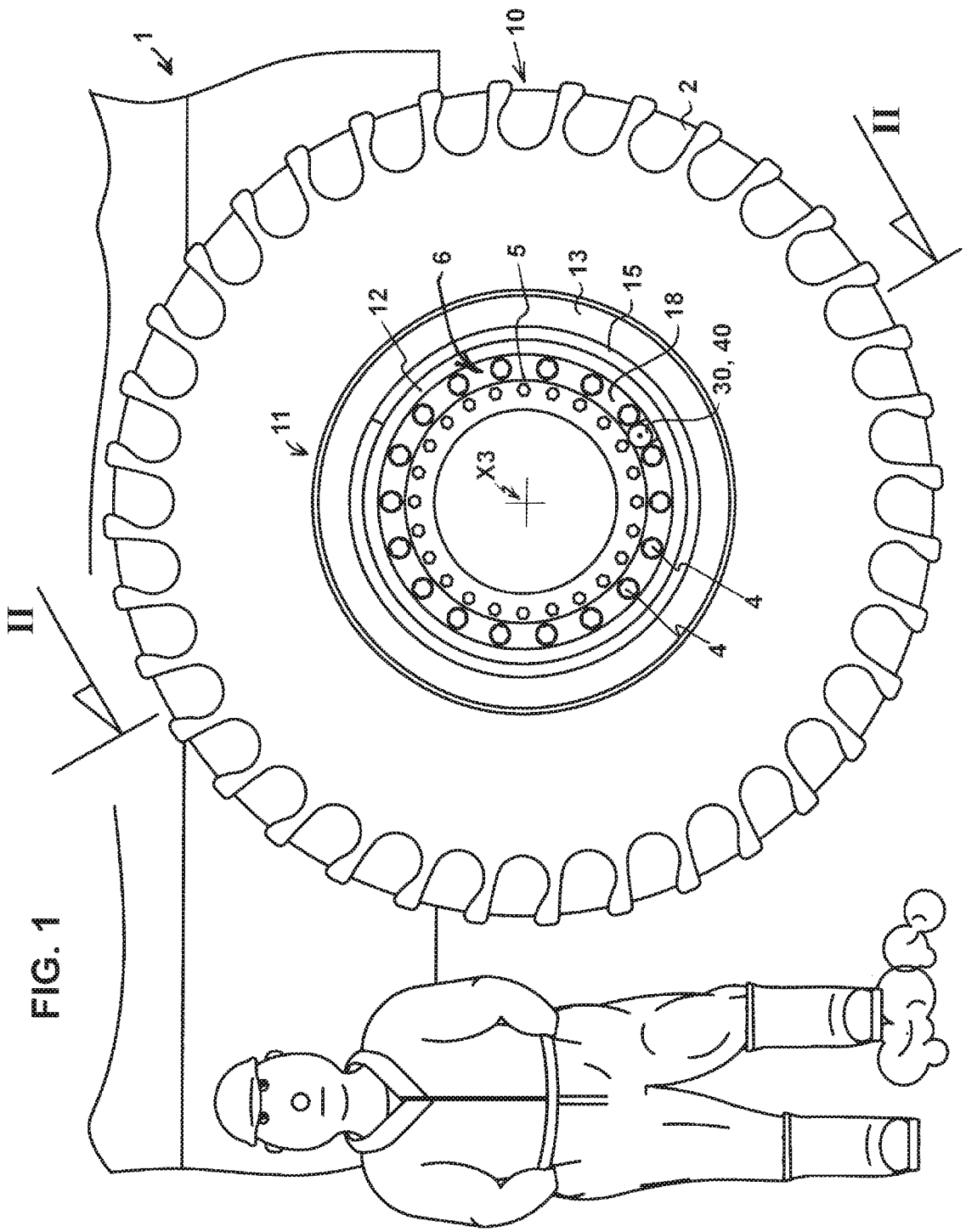
FIG. 1 shows one wheel of an articulated dump truck fitted with a pressure sensor enclosed within a protective assembly.
Figure 2:
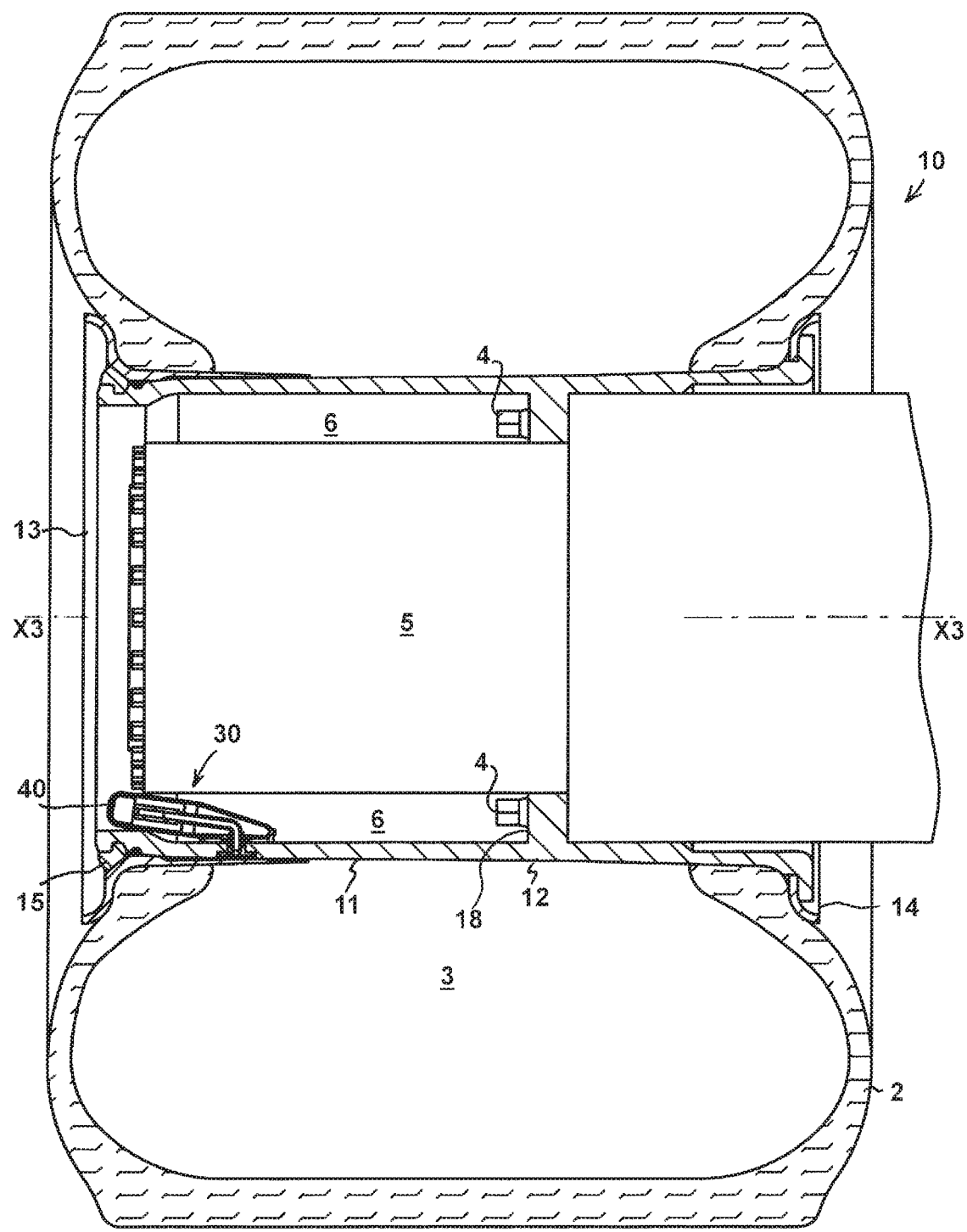
FIG. 2 is a section at II-II of FIG. 1 through the wheel and protective assembly.
Figure 9:
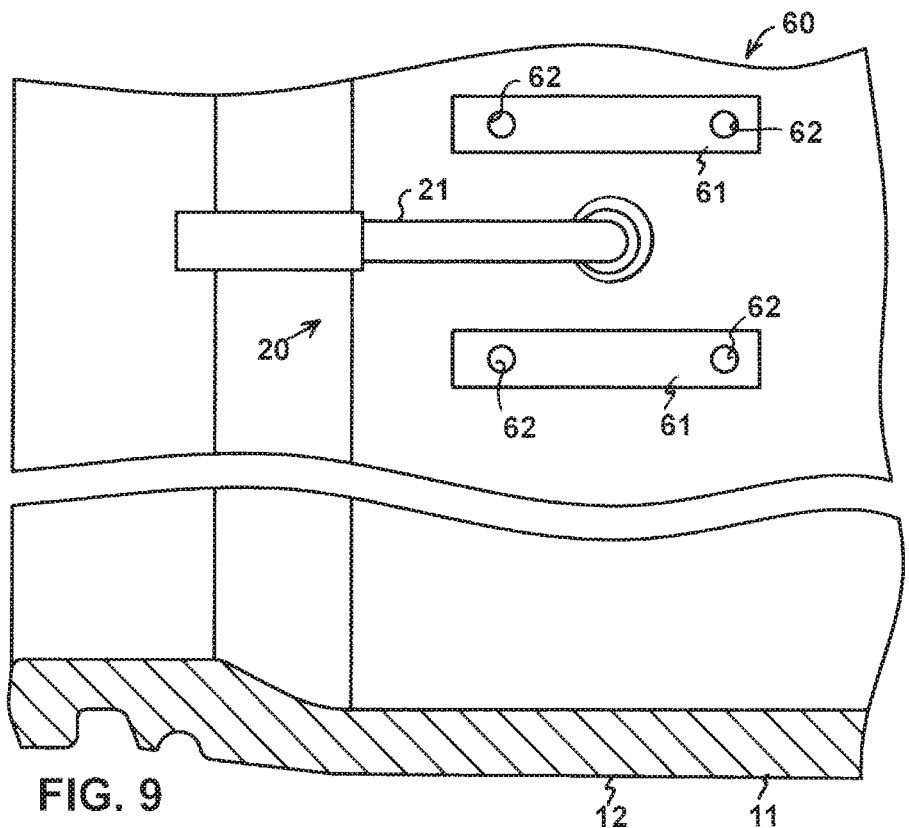
FIG. 9 shows part of the wheel rim with the valve assembly fixed between two welded mounting blocks forming a mount of the protective assembly.
Figure 11:
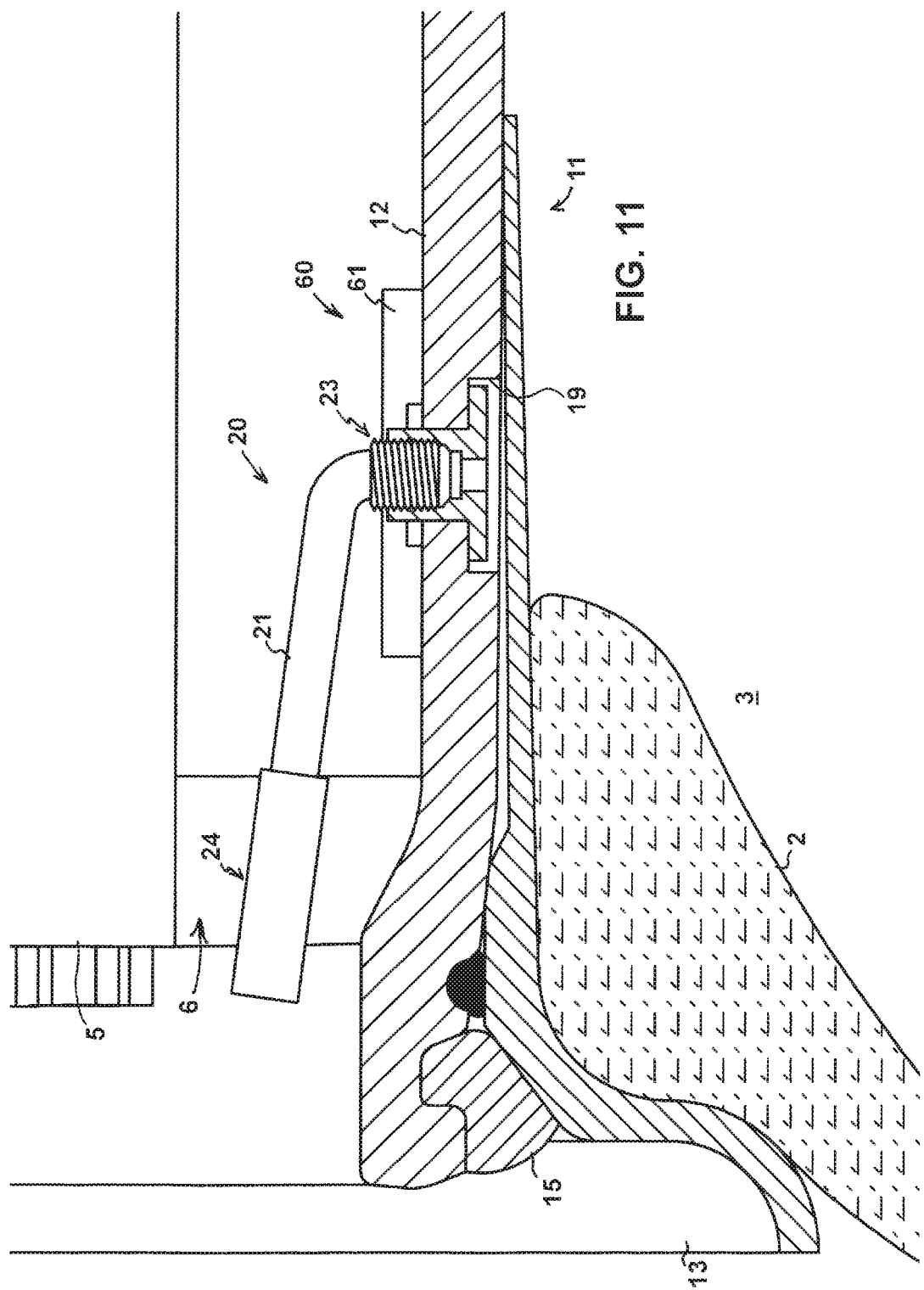

Referring to FIGS. 1, 2 and 11, a heavy vehicle 1 comprises a wheel 10 including a rim 11 and a pneumatic tyre 2 supported on the rim to define a pressurised interior space 3 between the tyre and the rim.

The vehicle may be for example an articulated dump truck or other heavy off-road vehicle configured for handling loose, bulk material.

Referring also to FIG. 8, a valve assembly 20 is mounted on the wheel and includes a valve stem 21 defining an internal conduit 22 and having a proximal end 23 and a distal end 24, and a valve core 25 which is sealingly received in the distal end 24 of the valve stem. The proximal end 23 of the valve stem is connected to the wheel, either by means of a threaded portion as shown or in any other conventional way as known in the art. The valve stem may be bent between its proximal and distal ends, typically close to its proximal end 23, so that its distal end portion extends, typically at an obtuse angle relative to its proximal end portion, as shown. In this way the valve stem is angled to extend axially outwardly through the annular space 6 between the wheel rim 11 and the hub 5 as further described below.

A pressure sensor 26 is mounted on the valve assembly 20 at the distal end 24 of the valve stem 21 so that in use the pressure sensor 26 is in fluid communication via the internal conduit 22 of the valve stem 21 with the pressurised interior space 3 of the tyre.

The pressure sensor 26 may be of any conventional type, typically including a pressure sending element and a radio frequency transmitter operating for example at around 433.92 MHz to send signals from the pressure sensor to a remote receiver (not shown) located in the vehicle 1 so that the pressure of the tyre 2 can be continuously monitored in use.

The pressure sensor 26 may comprise a threaded stem 27 which threadedly and sealing engages internal threads of the valve stem 21 or valve core 25 and depresses the movable stem or valve element (not shown) of the valve core 25.

The pressure sensor 26 may further include a temperature sensor, a battery or other power supply unit, a processor, a memory, and any other functionality as known in the art.

In the illustrated example the tyre 2 is of the tubeless type and the valve stem 21 is fixed to the rim 11, which includes a base 12, side rings 13, 14 and a lock ring 15 which cooperate to retain the tyre. The proximal end 23 of the valve stem is sealingly and threadedly received in the base 12 of the rim so that its internal conduit 22 is in fluid communication with the pressurised interior space 3 via an interstice 16 between the outer side ring 13 and the base 12 of the rim. A seal 17 is arranged between the outer side ring 13 and the base 12 of the rim to retain the compressed air in the space 3.

A mounting flange 18 extends radially inwardly from the base 12 of the rim and is connected via studs and wheel nuts 4 to the hub and final drive assembly 5 of the vehicle, whereby the wheel 10 is mounted on its axle to rotate about its axis X3, leaving a narrow annular space 6 between the hub 5 and the rim 11.

It should be understood that the wheel 10 could alternatively be of any other conventional type. For example, the rim could be a one-piece rim, and could be mounted in any conventional way on the hub of the vehicle. The tyre could be of the tube type, in which case the valve stem may be connected in fluidly sealed relation to the inner tube of the tyre to extend through a larger aperture in the rim. In such an arrangement the valve stem will not be fixed to the rim. However, since the protective assembly 30 is fixed to the wheel 10 (specifically, to the rim 11 or other hard parts of the wheel which mechanically connect the tyre 2 to the vehicle) and is not mounted on the valve stem 21, it may be installed and used generally in the same way in both tubeless and tube type wheels, as will now be described with reference to the illustrated embodiment.

Referring to FIGS. 3-7 and FIG. 9, the protective assembly 30 includes a body 31, a cap 40, a seal 50, and a mount 60 comprising a pair of steel blocks 61.

The steel blocks 61 comprise threaded holes 62 and are permanently attached by welding directly to the exterior surface of the base 12 of the wheel rim on either side of the aperture 19 in which the valve assembly 20 is installed.

The body 31 includes a proximal region 32 and a distal region 33 and defines an interior space 34 which opens to the exterior of the body to define a threaded aperture 35 at the distal region 33, and an opening 36 at the proximal region 32 of the body.

In this and other embodiments, the portion of the body which encloses the space may taper along its length axis away from its proximal region and towards its distal region, so that the body can be inserted at an angle into the annular space 6 between the hub and the wheel rim. This assists in installing the body in its use position over the fixed valve stem, wherein the body is held at a convenient angle so that the extremity of the body at its proximal end can pass through the small gap between the distal end of the valve stem and the hub until the valve stem is introduced into the opening 36. The body can then be moved further down over the valve stem and rotated towards its final, use position before fixing it to the mount or directly to the wheel, as further described below.

In the illustrated example the portion of the body defining the space is generally tubular with a mounting flange 37 being arranged around the proximal region 32. The distal region 33 is generally cylindrical defining a central length axis X1, with the tubular portion of the body tapering away from the cylindrical, distal region along its length axis X1 towards the proximal region 32. The tubular portion of the body extends angularly upwardly away from the mounting flange 37 along its length axis X1 to the aperture 35 which receives the cap in its closed position. The mounting flange 37 and proximal region 32 of the body may be curved to conform to the curvature of the wheel rim 11 in the use position.

The seal 50 defines a central aperture 51 and may be made for example from neoprene, polyurethane foam or other conformable or resilient material.

Figure 10:
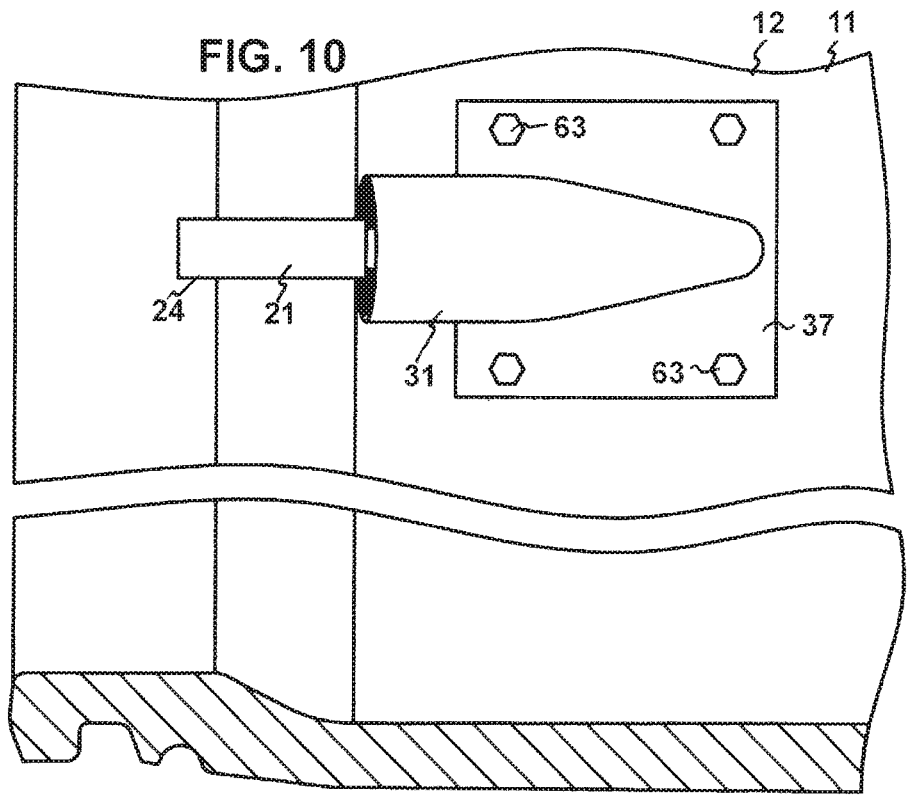
FIG. 10 shows the view of FIG. 9 with the body fixed to the mount.
Figure 12:
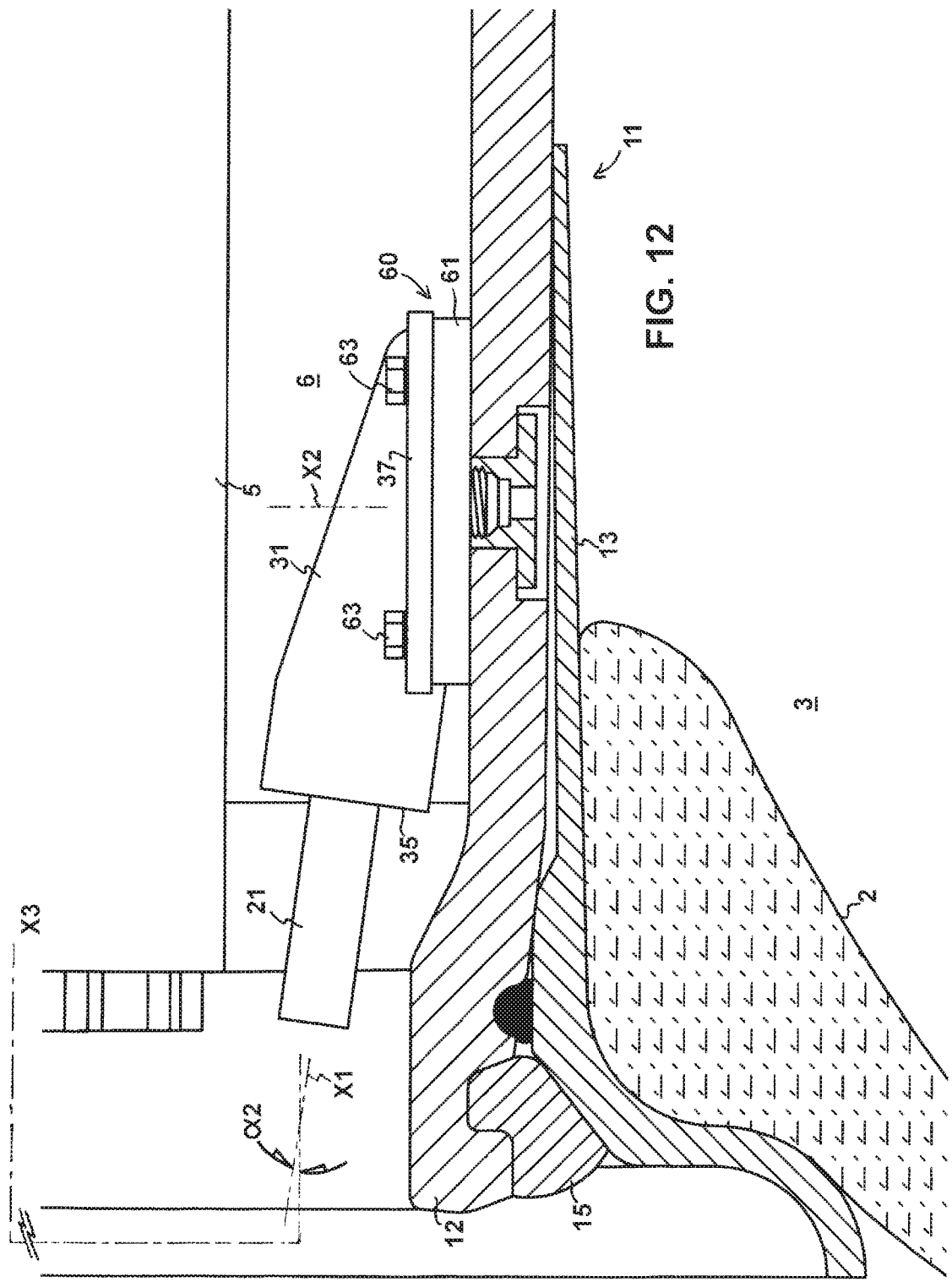

Referring to FIGS. 10, 12 and 13, the seal 50 is arranged in use between the body 31 and the wheel rim 11 so that the valve stem 21 passes through its central aperture 51.

The proximal region 32 of the body is releasably attached to the mount.in its use position by means of screws 63. The screws 63 pass through holes in the mounting flange 37 and engage in the threaded holes 62 in the blocks 61, compressing the seal 50 between the body 31 and the base 12 of the wheel rim.

In the use position of the body, the valve stem 21 extends through the opening 36 and is received at least partially within the interior space 34. The seal 50 fluidly seals the space 34 at the proximal region of the body, preventing the ingress of water or dirt via the opening into the space 34 containing the valve stem and pressure sensor.

With the body fixed in its use position, the pressure sensor 26 is connected to the distal end 24 of the valve stem as shown in FIG. 13.

The cap 40 can then be releasably attached to the distal region 33 of the body 31 in its closed position as shown in FIG. 14, so that the cap 40 and the body 31 together enclose the pressure sensor 26 and the valve stem 21 in the use position of the body and the closed position of the cap.

The cap 40 may be generally cylindrical with a threaded open end 41 as shown, which is engaged in the threaded aperture 35 before rotating the cap 40 to sealingly and releasably attach it to the body.

In the illustrated example, the opening 36 of the body is offset from the central length axis X1 of the body to accommodate the bent valve stem 21 which is received within the space 34 in the use position of the body.

Thus, it can be seen that the space 34 extends along the length axis X1 of the body which passes through the cap 40 in the closed position of the cap but does not pass through the opening 36. The length axis X1 passes centrally through the aperture 35, while the opening 36 extends along an opening axis X2 which passes generally centrally through the opening and intersects the length axis X1 to define an angle α1 (FIG. 5) between the respective axes X1, X2 in a plane containing both axes.

The angle α1 may correspond to the angle between the proximal and distal end portions of the valve stem 21 and may be a relatively large acute angle, which is to say, an angle greater than 45° but less than 90°.

In its use position the body 31 may thus extend as shown along its length axis X1 proximate the rim 11 and in spaced and substantially parallel relation with the axis of rotation X3 of the wheel—which is to say, with its length axis X1 at an angle α2 (FIG. 12) from 0° to 45° with respect to the axis X3. In this configuration it can be seen that the body 31 and cap 40 are received within the narrow annular space 6 between the hub 5 and the wheel rim 11, so that the cap 40 and the pressure sensor 26 are accessible for maintenance at the exterior of the wheel, as shown in FIGS. 1 and 2.

Preferably the cap 40 defines an interior cavity 42 for receiving the pressure sensor 26 so that the pressure sensor extends within the interior cavity 42 of the cap in the use position of the body 31 and the closed position of the cap. By removing the cap 40, the pressure sensor 26 is exposed so that it can easily be removed to access the valve (i.e. the valve core 25 within the distal end 24 of the valve stem 21) to adjust the tyre pressure.

Preferably the cap 40 is pervious to radio frequency signals emitted by the pressure sensor 26, so that by arranging the pressure sensor 26 to extend within the cap 40 its signals may readily be detected.

The body 31 may thus be made from a material that is mechanically strong but impervious to radio frequency signals. Alternatively the body may be pervious to radio signals.

The body 31 may be made for example from cast aluminium or non-metal, e.g. plastics material, while the cap 40 may be made from a non-metal material pervious to radio frequency signals such as polypropylene, ABS, nylon or other suitable plastics.

In this and other embodiments, the body may be configured such that the body is removable from the wheel and replaceable in its use position without damaging the valve stem or disconnecting the proximal end of the valve stem from the wheel.

In the illustrated example, the body 31 is installed by advancing the body over the valve stem 21 in the installed position of the valve stem as shown in FIG. 11, so that the distal end 24 of the valve stem passes through the opening 36 into the interior 34 of the body. The body 31 is then fixed to the mount 60 by the screws 63, after which the pressure sensor 26 can be installed and covered by the cap 40. Disassembly is achieved by reversing this procedure.

In this way the body can be removed and replaced without disturbing the valve stem, and hence without depressurising the tyre.

INDUSTRIAL APPLICABILITY

The novel protective assembly can be used on off-road vehicles and other applications where it is desired to protect a tyre pressure sensor located exterior to the wheel from damage or fouling due to impact or accumulation of debris. It is particularly useful in heavy vehicles where the valve stem must be accommodated within a limited annular space between the wheel rim and the hub and final drive assembly, since the protective assembly may be configured to permit the body to be removed from around the valve stem so as to facilitate easier access, for example to fixings of the hub and final drive assembly or to the wheel nuts or clamps by which the disc or rim of the wheel is fixed to the hub, without requiring deflation of the tyre. This facilitates more convenient maintenance and inspection of the wheel components.

The novel protective assembly can be used to protect a pressure sensor mounted on a valve stem which is connected to a wheel rim of a tubeless tyre, or to the inner tube of a tube type tyre.

In summary, a tyre pressure sensor may be mounted at the distal end of a valve stem mounted on a wheel, and protected by a protective assembly comprising a body which is releasably attachable to the wheel and a cap which is releasably attachable to the body, so that the valve stem and pressure sensor are enclosed within the body and the cap.

In alternative embodiments the mount could be configured as a single element, or more than two elements, the or each element being permanently attached to the wheel in any convenient way, e.g. by welding or by means of threaded fasteners or clamps. Alternatively the proximal region of the body could be releasably attachable directly the rim or to another part of the wheel, for example by means of clamps, threaded fasteners or other suitable fixings, rather than to a mount permanently attached to the wheel. The body could be attached to the wheel in any convenient position either with or without a seal, and may be configured to receive a valve stem of any shape, whether angled or straight. Where a seal is provided, it may be of any convenient shape, or may be formed in situ by settable, fluid material. The cap could be releasably attached to the body via a threaded or non-threaded connection, for example, by urging it in the direction of the length axis X1 to engage the body in push-fit relation, optionally with an additional clip or other retaining feature. An O-ring or other seal may be arranged between the cap and the body.

Many further adaptations are possible within the scope of the claims.

In the claims, reference numerals and characters are provided in parentheses solely for ease of reference and are not to be construed as limiting features.

What is claimed is:

1. A protective assembly for use with a pressure sensor mounted on a valve assembly, the valve assembly being mounted on a wheel;
the valve assembly including a valve stem having a proximal end and a distal end,
the proximal end of the valve stem being connected to the wheel,
the pressure sensor being mounted at the distal end of the valve stem in fluid communication via the valve stem with a pressurised interior space of a pneumatic tyre of the wheel;
the protective assembly including:
a body and
a cap;
the body including a proximal region and a distal region and defining a space, the space opening to an exterior of the body at the proximal region and the distal region of the body;
the proximal region of the body being releasably attachable to the wheel in a use position of the body to receive the valve stem within the space;
the cap being releasably attachable to the distal region of the body in a closed position of the cap so that the cap and the body together enclose the pressure sensor and the valve stem in the use position of the body and the closed position of the cap.

2. The protective assembly according to claim 1, wherein the cap defines an interior cavity for receiving the pressure sensor and is pervious to radio frequency signals.

3. The protective assembly according to claim 1, wherein the protective assembly includes a mount, the mount being permanently attachable to the wheel, the proximal region of the body being releasably attachable to the mount.

4. The protective assembly according to claim I, wherein the protective assembly includes a seal, the seal being arranged to fluidly seal the space at the proximal region of the body in the use position of the body.

5. The protective assembly according to claim 1, wherein the space extends along a length axis of the body and opens to the exterior of the body via an opening at the proximal region of the body,
and the length axis of the body passes through the cap in the closed position of the cap but does not pass through the opening,
the opening extending along an opening axis which intersects the length axis to accommodate a bent valve stem in the use position of the body.

6. An assembly including:
a protective assembly according to claim 1,
a wheel,
a valve assembly mounted on the wheel, and
a pressure sensor mounted on the valve assembly;
the wheel including a rim and a pneumatic tyre supported on the rim,
the valve assembly including a valve stem having a proximal end and a distal end,
the proximal end of the valve stern being connected to the wheel,
the pressure sensor being mounted at the distal end of the valve stem in fluid communication via the valve stem with a pressurised interior space of the tyre;
the proximal region of the body being releasably attached to the wheel in the use position of the body, the valve stem being received within the space;
the cap being releasably attached to the distal region of the body in the closed position of the cap so that the cap and the body together enclose the pressure sensor and the valve stem.

7. The assembly according to claim 6, wherein the body is removable from the wheel and replaceable in its use position without damaging the valve stern or disconnecting, the proximal end of the valve stern from the wheel.

8. The assembly according to claim 6, wherein the protective assembly includes a mount, the mount being permanently attached directly to the rim, the proximal region of the body being releasably attached to the mount.

9. The assembly according to claim 6, wherein the valve stem is bent between its proximal end and its distal end,
and the space extends along a length axis of the body and opens to the exterior of the body via an opening at the proximal region of the body,
and the length axis of the body passes through the cap in the closed position of the cap but does not pass through the opening,
the opening extending along an opening axis which intersects the length axis of the body to accommodate the bent valve stem in the use position of the body,
the body extending along the length axis of the body proximate the rim and in spaced and substantially parallel relation with an axis of rotation of the wheel.

10. The assembly according to claim 6, wherein the cap defines an interior cavity. and the pressure sensor extends within the interior cavity of the cap in the use position of the body and the closed position of the cap, and the cap is pervious to radio frequency signals emitted by the pressure sensor.

* * * * *